3,316,240
WATER-INSOLUBLE MONOAZO DYESTUFFS
Alistair Howard Berrie and Raymond Windle, both of Manchester, England, assignors to Imperial Chemical Industries Limited, London, England, a corporation of Great Britain
No Drawing. Filed Sept. 23, 1964, Ser. No. 398,777
Claims priority, application Great Britain, Oct. 8, 1963, 39,625/63
2 Claims. (Cl. 260—163)

This invention relates to new azo dyestuffs and more particularly it relates to new water-insoluble azo dyestuffs which are valuable for colouring synthetic textile materials in particular polyester textile materials.

According to the invention there are provided the water-insoluble azo dyestuffs of the formula:

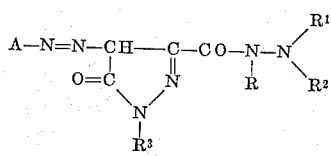

wherein

A represents the radical of a diazo compound of the benzene, naphthalene or heterocyclic series;
R and $R^1$ each independently represent a hydrogen atom or a lower alkyl radical; and
$R^2$ and $R^3$ each independently represent a hydrogen atom, a lower alkyl radical, or an optionally substituted phenyl radical; provided that the dyestuffs are free from carboxylic acid and sulphonic acid groups.

Throughout this specification the term "lower alkyl" is used to denote alkyl radicals of low molecular weight, in particular alkyl radicals containing from one to four carbon atoms.

As examples of the lower alkyl radicals represented by R, $R^1$, $R^2$ and $R^3$ there may be mentioned ethyl, propyl, butyl and, preferably, methyl radicals.

As examples of the optionally substituted phenyl radicals represented by $R^2$ there may be mentioned methylphenyl, methoxyphenyl and chlorophenyl radicals.

It is however preferred that R represents a hydrogen atom; that $R^1$ represents a hydrogen atom or a methyl radical; and that $R^2$ represents a hydrogen atom or a methyl or phenyl radical.

Preferably R, $R^1$ and $R^2$ each represent a hydrogen atom.

As examples of the optionally substituted phenyl radicals represented by $R^3$ there may be mentioned lower alkylphenyl, in particular methylphenyl, lower alkoxyphenyl, in particular methoxyphenyl, chlorophenyl, nitrophenyl and dichlorophenyl radicals.

As examples of the radicals of diazo compounds of the heterocyclic series represented by A there may be mentioned radicals of diazo compounds of the thiazole, benzthiazole, thiadiazole or thiophene series. It is however preferred that A represents the radical of a diazo compound of the benzene series.

According to a further feature of the invention there is provided a process for the manufacture of the water-insoluble azo dyestuffs, as hereinbefore defined, which comprises coupling a diazotised primary amine of the formula: A—$NH_2$, with a coupling component of the formula:

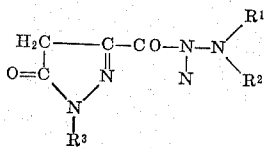

(Formula I)

wherein A, R, $R^1$, $R^2$ and $R^3$ have the meanings stated above.

The process of the invention may be conveniently brought out by adding an aqueous solution or suspension of the diazotised primary amine to a solution of the coupling component in a dilute aqueous solution of an acid such as hydrochloric acid, or of an alkali such as sodium hydroxide, stirring the resulting mixture, preferably at a pH between 4 and 12, to effect formation of the azo dyestuff, and finally isolating the azo dyestuff by conventional methods.

The diazotised primary amines of the formula: A—$NH_2$ which are used in the process of the invention may be any diazotised primary amine of the benzene, naphthalene or heterocyclic series which is free from carboxylic acid or sulphonic acid groups.

As examples of primary amines of the benzene series there may be mentioned aniline, o-, m- or p-toluidine, o-, m- or p-anisidine, o-, m- or p-chloroaniline, o-, m- or p-bromoaniline, o-, m- or p-nitroaniline, 2:5-dichloroaniline, 2:4-dinitroaniline, 2:4-dinitro-6-(chloro or bromo)-aniline, 4-methanesulphonylaniline, 4-aminobenzotrifluoride, 4- or 5-nitro-2-toluidine, 4- or 5-nitro-2-anisidine, 4- or 5-chloro-2-anisidine, 4- or 5-chloro-2-toluidine, 4- or 5-bromo-2-anisidine, 2:6-di(chloro- or bromo-)-4-nitroaniline, 2:4:6-trinitroaniline, 2:4-dinitro-6-carbomethoxyaniline, 2-amino-5-nitrobenzotrifluoride, 2:4-bis(methanesulphonyl)aniline, 2-(chloro- or bromo-)-4-nitroaniline, methylanthranilate, 4- or 5-nitromethylanthranilate, 4-aminobenzamide, 2:6-di(chloro- or bromo-)-aniline-4-sulphonamide, 2:6-di(chloro- or bromo-)-4-methylsulphonylaniline, 2:5-di(chloro- or bromo-)-4:6-dinitroaniline, 2 - amino-3:5-dinitrobenzotrifluoride, 3-amino-2-(chloro- or bromo-)-4:6-dinitro-(toluene or anisole), 3-amino-4-(chloro- or bromo-)-2:6-dinitro-(toluene or anisole), 2- or 4-cyanoaniline, 4-nitro-2-cyanoaniline, 2:4-dinitro-6-cyanoaniline, 2-nitro-4-cyanoaniline, 2-chloro-4-cyanoaniline, 3-amino-2:4:6-trinitrotoluene, 2-(chloro- or bromo-)-4-methylsulphonyl-aniline, 3-(chloro- or bromo-)-4-thiocyanatoaniline, 2-(chloro- or bromo-)-4-sulphamyl-aniline, 2-amino-5-nitrophenylmethanesulphone, 2-amino-3:5-dinitrophenylmethylsulphone, 2-amino-3-(chloro- or bromo-) - 5 - nitrophenylmethylsulphone, 2-sulphamyl-4-nitroaniline, 2-methylsulphamyl-4-nitroaniline, 2-ethylsulphamyl-4-nitroaniline, 2-butylsulphamyl-4-nitroaniline, 2-dimethylsulphamyl-4-nitroaniline, 2-methylsulphamyl-4:6-dinitroaniline, 2-methylsulphamyl - 4 - nitro-6-(chloro- or bromo-)aniline, 2-phenylsulphamyl-4-nitroaniline, methyl 2-amino-3-(chloro- or bromo-)-5-nitrobenzoate, methyl 2-amino-3:5-dinitrobenzoate, dimethyl 2-aminoterephthalate, dimethyl 2-amino-5-nitroterephthalate, 4-aminoazobenzene, 4-amino-4'-nitroazobenzene and 2-methyl-4-aminoazobenzene.

As specific examples of the primary amines of the naphthalene series there may be mentioned 1- or 2-naphthylamine, 1-naphthylamine-4-sulphonamide, 4-methylsulphonyl-1-naphthylamine and 6-(N-methylsulphamyl)-2-naphthylamine.

As specific examples of the primary amines of the heterocyclic series there may be mentioned primary amines of the thiazole series such as 2-aminothiazole, 5-nitro-2-aminothiazole, 4-methyl - 5 - nitro - 2 - aminothiazole, 4-phenyl-5-nitro-2-aminothiazole and 2-amino-5-methylsulphonylthiazole; primary amines of the benzthiazole series such as 2-aminobenzthiazole, 6-(methoxy or ethoxy)-2-aminobenzthiazole, 2 - amino-6-methylsulphonylbenzthiazole, 2-amino-6-nitrobenzthiazole, 2-amino-6-thiocyanobenzthiazole, 2-amino-6-cyanobenzthiazole and 2-amino-6-($\beta$-hydroxyethylsulphonyl)benzthiazole; primary amines of the thiadiazole series such as 2-amino-5-methyl-1:3:4-thiadiazole, 2-amino-5-phenyl-1:3:4-thiadiazole, 5-amino- 3-phenyl-1:2:4-thiadiazole and 5-amino-3-methyl-1:2:4-thiadiazole, and primary amines of the thiophene series such as 2-amino-3-nitro-5-acetylthiophene and 2-amino-3-nitro-5-benzoylthiophene.

The coupling components of Formula I may themselves be obtained by reacting an acid chloride or an ester of a pyrazolone carboxylic acid of the formula:

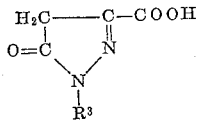

with a hydrazine of the formula:

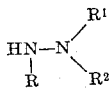

wherein R, $R^1$, $R^2$ and $R^3$ have the meanings stated above.

As specific examples of the coupling components of Formula I there may be mentioned 3-carboxyhydrazido-5-pyrazolone,
1-methyl-3-carboxyhydrazido-5-pyrazolone,
1-phenyl-3-carboxyhydrazido-5-pyrazolone,
1-(2'-, 3'- or 4'-methylphenyl)-3-carboxyhydrazido-5-pyrazolone,
1-(2'-, 3'- or 4'-chlorophenyl)-3-carboxyhydrazido-5-pyrazolone,
1-(2':5'-dichlorophenyl)-3-carboxyhydrazido-5-pyrazolone,
1-(2'-, 3'- or 4'-nitrophenyl)-3-carboxyhydrazido-5-pyrazolone,
1-(2'-, 3'- or 4'-methoxyphenyl)-3-carboxy-($\beta$-phenyl)-hydrazido-5-pyrazolone,
1-phenyl-3-carboxy-($\beta$-phenyl)hydrazido-5-pyrazolone,
1-phenyl-3-carboxy-($\beta$:$\beta$-dimethyl)hydrazido-5-pyrazolone,
1-phenyl-3-carboxy-($\beta$-methyl-$\beta$-phenyl)hydrazido-5-pyrazolone,
1-phenyl-3-carboxy-($\beta$-chlorophenyl)hydrazido-5-pyrazolone,
1-(2'-methylphenyl)-3-carboxy-($\beta$-[methylphenyl])-hydrazido-5-pyrazolone and
1-(2'-chlorophenyl)-3-carboxy-($\beta$-[methoxyphenyl])-hydrazido-5-pyrazolone.

According to a further feature of the invention there is provided an alternative process for the manufacture of the water-insoluble azo dyestuffs, as hereinbefore defined, which comprises reacting a hydrazine of the formula:

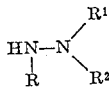

with a functional derivative of a carboxylic acid group containing azo compound of the formula:

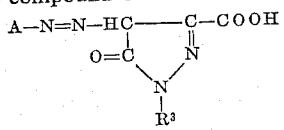

Formula II wherein A, R, $R^1$, $R^2$ and $R^3$ have the meanings stated.

The alternative process of the invention may be conveniently brought about by reacting at least one molecular proportion of the hydrazine with the functional derivative (such as the acid chloride or an ester) of the said compound in the presence of water or an organic liquid such acetone. The resulting azo dyestuff can then be isolated from the reaction medium by conventional methods.

As specific examples of the said hydrazines there may be mentioned phenylhydrazine, N:N-dimethylhydrazine, N-methyl-N-phenylhydrazine, N:N:N'-trimethyhydrazine and, above all, hydrazine.

The azo compounds of Formula II may themselves be obtained by coupling a diazotised primary amine of the formula: $ANH_2$ with a pyrazolone of the formula:

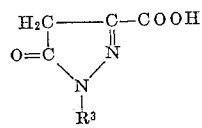

wherein A and $R^3$ have the meanings stated above.

A preferred class of the water-insoluble azo dyestuffs of the invention comprises the water-insoluble azo dyestuffs of the formula:

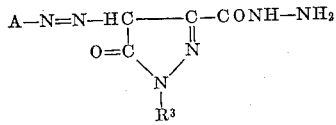

wherein A and $R^3$ have the meanings stated above.

It is further preferred that A represents an optionally substituted phenyl radical; and that $R^3$ also represents an optionally substituted phenyl radical.

The azo dyestuffs, as hereinbefore defined, are valuable for colouring synthetic textile materials, for example cellulose acetate textile materials such as secondary cellulose acetate and cellulose triacetate textile materials, polyamide textile materials such as polyhexamethyleneadipamide textile materials, and preferably aromatic polyester textile materials such as polyethylene terephthalate textile materials. Such textile materials can be in the form of thread yarn or woven or kitted fabric.

Such textile materials can conveniently be coloured with the azo dyestuffs, as hereinbefore defined, by immersing the textile material in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile materials it is preferred to carry out the dyeing process at a temperature between 60° and 95° C.; in the case of cellulose triacetate or polyamide textile materials it is preferred to carry out the dyeing process at 95° to 100° C.; in the case of aromatic polyester textile materials the dyeing process can either be carried out at a temperature between 90° and 100° C., preferably in the presence of a carrier such as diphenyl or o-hydroxydiphenyl, or at a temperature above 100° C., preferably at a temperature between 120° and 130° C., under superatmospheric pressure.

Alternatively the aqueous dispersion of the said dyestuff can be applied to the textile material by a padding or printing process, followed by heating or steaming of the textile material. In such processes it is preferred to incorporate a thickening agent, such as gum tragacanth, gum arabic or sodium alginate, into the aqueous dispersion of the said monoazo dyestuff.

At the conclusion of the colouring process it is preferred to give the coloured textile material a rinse in water or a brief soaping treatment before finally drying the coloured textile material. In the case of aromatic polyester extile materials it is also preferred to subject the coloured textile material to a treatment in an alkaline aqueous solution of sodium hydrosulphite before the soaping treatment in order to remove loosely attached dyestuff from the surface of the textile material.

The azo dyestuffs have excellent affinity and building up properties on synthetic textile materials, and in particular on aromatic polyester textile materials, so enabling deep shades to be obtained. The resulting colourations which range in shade from greenish-yellow to orange, have excellent fastness to light, to wet treatments, and, in particular, to dry heat treatments such as those carried out at high temperatures during pleating operations.

The invention is illustrated but not limited by the following examples in which the parts are by weight.

Example 1

A solution of 1.3 parts of p-chloroaniline in a mixture of 12 parts of water and 3 parts of concentrated hydrochloric acid is cooled to between 0° and 5° C. and 5 parts of a 2 N aqueous solution of sodium nitrite are added. After stirring from 15 minutes, the excess nitrous acid is decomposed by the addition of sulphamic acid and the diazo solution is filtered. 2.18 parts of 1-phenyl-3-carboxyhydrazido-5-pyrazolone are dissolved in 250 parts of water and 5 parts of 2 N sodium hydroxide solution at room temperature. 3 parts of sodium carbonate are then added followed by the diazo solution. After stirring for 1 hour, the mixture is acidified with acetic acid and the precipitated dyestuff is filtered off, washed with water and dried.

When dyed on polyester textile materials from an aqueous dispersion, the dyestuff so obtained builds up well to give strong bright yellow shades possessing good fastness to heat treatments and to light.

The following table gives further examples of the azo dyestuffs of the invention which are obtained by diazotising the amines listed in the second column of the table and coupling with the pyrazolones listed in the third column of the table by methods similar to that described in Example 1. The fourth column of the table indicates the shades obtained when the dyestuffs are applied to polyester textile materials.

| Example | Amine | Pyrazolone | Shade |
|---|---|---|---|
| 2 | β-Ethoxyethylanthranilate | 1-phenyl-3-carboxyhydrazido-5-pyrazolone | Yellow. |
| 3 | β-Ethoxyethyl-p-aminobenzoate | ---do--- | Do. |
| 4 | p-Nitroaniline | ---do--- | Do. |
| 5 | o-Chloroaniline | ---do--- | Do. |
| 6 | 2-nitro-4-methoxyaniline | ---do--- | Do. |
| 7 | p-Chloroaniline | 3-carboxyhydrazido-5-pyrazolone | Orange. |
| 8 | p-Nitroaniline | ---do--- | Yellow. |
| 9 | Aniline | 1-methyl-3-carboxyhydrazido-5-pyrazolone | Do. |
| 10 | 2-nitro-4-methoxyaniline | ---do--- | Do. |
| 11 | p-Nitroaniline | 1-(4'-methoxyphenyl)-3-carboxyhydrazido-5-pyrazolone | Reddish-yellow. |
| 12 | ---do--- | 1-(3'-methylphenyl)-3-carboxyhydrazido-5-pyrazolone | Do. |
| 13 | ---do--- | 1-(3'-nitrophenyl)-3-carboxyhydrazido-5-pyrazolone | Do. |
| 14 | ---do--- | 1-(2'-chlorophenyl)-3-carboxyhydrazido-5-pyrazolone | Do. |
| 15 | ---do--- | 1-(2':5'-dichlorophenyl)-3-carboxyhydrazido-5-pyrazolone | Do. |
| 16 | α-Naphthylamine | 1-phenyl-3-carboxyhydrazido-5-pyrazolone | Do. |
| 17 | 2-amino-6-thiocyanobenzthiazole | ---do--- | Orange. |
| 18 | 5-nitro-2-aminobenzthiazole | ---do--- | Do. |
| 19 | 4-aminoazobenzene | ---do--- | Do. |
| 20 | o-Toluidine | ---do--- | Do. |
| 21 | p-n-Butylaniline | ---do--- | Yellow. |
| 22 | p-Aminoacetanilide | ---do--- | Do. |
| 23 | 2-cyano-4-nitroaniline | ---do--- | Orange. |
| 24 | 2-trifluoromethylaniline | ---do--- | Do. |
| 25 | p-Chloroaniline | ---do--- | Yellow. |
| 26 | ---do--- | 1-phenyl-3-carboxy(β:β-dimethyl)hydrazido-5-pyrazolone | Do. |
| 27 | ---do--- | 1-phenyl-3-carboxy(α:β-trimethyl)hydrazido-5-pyrazolone | Do. |
| 28 | ---do--- | 1-phenyl-3-carboxy(β-phenyl)hydrazido-5-pyrazolone | Orange. |
| 29 | ---do--- | 1-phenyl-3-carboxy(β-p-methoxyphenyl)hydrazido-5-pyrazolone | Do. |
| 30 | ---do--- | 1-phenyl-3-carboxy(β-o-methylphenyl)hydrazido-5-pyrazolone | Do. |
|  |  | 1-phenyl-3-carboxy(β-m-chlorophenyl)hydrazido-5-pyrazolone | Do. |

Example 31

A mixture of 5 parts of 1-phenyl-3-carbomethoxy-4-(4'-chlorophenylazo)-5-pyrazolone and 100 parts of hydrazine hydrate is stirred together at the boil under a reflux condenser for 2 hours. The mixture is cooled, acidified by the addition of a concentrated aqueous solution of hydrochloric acid, and the precipitated dyestuff is filtered off, washed with water and dried.

The dyestuff so obtained is identical with the dyestuff of Example 1.

What we claim is:

1. The water-insoluble azo dyestuffs which are free from carboxylic acid and sulphonic acid groups and which are represented by the formula:

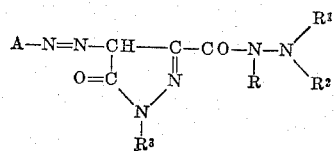

wherein

A represents the radical of a diazo compound selected from the class consisting of diazo compounds of the benzene, naphthalene, thiazole and benzthiazole series;

R and $R^1$ are each independently selected from the class consisting of hydrogen and lower alkyl;

$R^2$ is selected from the class consisting of hydrogen, lower alkyl, phenyl, methoxyphenyl, methylphenyl and chlorophenyl;

and $R^3$ is selected from the class consisting of hydrogen, lower alkyl, phenyl, lower alkylphenyl, lower alkoxyphenyl, chlorophenyl, nitrophenyl and dichlorophenyl.

2. The water-insoluble azo dyestuffs which are free from carboxylic acid and sulphonic acid groups and which are represented by the formula:

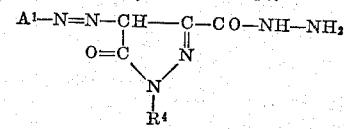

wherein $A^1$ is the radical of a diazo component of the benzene series, and $R^4$ is a phenyl radical.

No references cited.

CHARLES B. PARKER, *Primary Examiner.*

DONALD M. PAPUGA, *Assistant Examiner.*